INVENTORS,
NORBERT D. LARKY &
CARMEN LOUIS CUCCIA
BY [signature]
ATTORNEY

Sept. 13, 1960 N. D. LARKY ET AL 2,952,736

COLOR TELEVISION RECEIVER DEMODULATOR AND COLOR BALANCE CIRCUITS

Filed Dec. 28, 1956 4 Sheets-Sheet 2

INVENTORS
NORBERT D. LARKY &
CARMEN LOUIS CUCCIA
BY
[signature]
ATTORNEY

INVENTORS
NORBERT D. LARKY &
CARMEN LOUIS CUCCIA
BY
[signature]
ATTORNEY

INVENTORS
NORBERT D. LARKY &
CARMEN LOUIS GUCCIA
BY [signature]
ATTORNEY

United States Patent Office 2,952,736

Patented Sept. 13, 1960

2,952,736

COLOR TELEVISION RECEIVER DEMODULATOR AND COLOR BALANCE CIRCUITS

Norbert D. Larky, Somerville, and Carmen L. Cuccia, Princeton, N.J., assignors to Radio Corporation of America, a corporation of Delaware Filed Dec. 28, 1956, Ser. No. 631,232

15 Claims. (Cl. 178—5.4)

The present invention relates to an improved and simplified color demodulator, for demodulating a plurality of color difference signals in a color television receiver, and also for altering the relative amplitude level of one or more of each of a plurality of color difference signals in a chrominance signal.

The color television signal conforming to present standards includes both a luminance signal and a chrominance signal. The luminance signal is a wide-band signal containing information relating to the brightness of a televised color image. The chrominance signal is a modulated subcarrier containing modulations representative of a plurality of color difference signals; each of said color difference signal modulations occurs in said chrominance signal at a prescribed phase of said chrominance signal relative to a reference phase. Each color difference signal, when combined with a luminance signal, provides component color information of the televised image, with the amplitude of the color difference signal in combination with a luminance signal, also providing a measure of the saturation of that particular color in the televised image.

A color difference signal may be demodulated from the chrominance signal by synchronous detection or synchronous demodulation; that is, by mixing or heterodyning the chrominance signal with a demodulating signal having the frequency of the chrominance signal subcarrier and having the phase of the modulation representative of the desired color difference signal in the chrominance signal.

In order that synchronous demodulation can be provided in a circuit remote from a broadcast transmitter, it is necessary that demodulating signals having accurately maintained frequency and phase relative to the reference phase of the chrominance signal be developed in that remote circuit. This is made possible by the transmission of color synchronizing bursts during each retrace interval of the color television signal. Each color synchronizing burst occurs on the "back porch" of the horizontal synchronizing pulse, and has the frequency and the reference phase of said chrominance signal.

In many circuits now in common use in color television receivers, a plurality of demodulating devices such as electron tubes or transistors are employed for the demodulation of different color difference signals from the chrominance signal. The use of different demodulating devices requires that each of the color demodulators functions separately, with the aging or malfunction of one of the demodulating devices thereupon causing a deterioration in the overall performance of the color demodulating circuit. The use of a plurality of demodulating devices also increases the cost of a color television receiver.

In other types of color television receivers, the color kinescope demodulates the chrominance signal; such color kinescopes often employ beam-target areas having different color-emitting surfaces which are characterized by different light-output efficiencies. It is then required that the chrominance signal, which is transmitted to include red, blue, and green color difference information modulations according to the signal-strength ratios, $$.877:.493:1.423$$

be altered or color balanced so that each component color of the televised image will be reproduced with correct relative intensity by the color kinescope.

It is therefore an object of the invention to derive different color information signals from a chrominance signal using a single electron flow device.

It is another object of the invention to provide a color demodulator of simplified construction and performance.

It is a further object of the present invention to provide means for obtaining a plurality of color difference signals from a single demodulating device.

It is a still further object of the invention to provide a single demodulating device circuit which produces a plurality of color difference signals with a minimum of signal contamination and with optimum simplicity of construction and circuitry.

It is still another object of the invention to provide a simple means to alter the relative signal level of prescribed color difference information modulations in a chrominance signal.

It is also an object of the invention to provide an improved means for providing color balance in a color television receiver.

According to the invention, a chrominance signal is processed in a single electron flow device, such as a multi-grid electron tube, to demodulate and develop color difference signal information obtained from a first region in the path of the electron flow into an output load, and to derive different color information from a subsequent region in the path of the electron flow wherein occurs both chrominance signal information modified by the previous demodulation into the output load and also the previously demodulated signal information.

According to one form of the invention, a single electron stream device is caused to develop a plurality of color difference signals by introducing different demodulating signals into the electron stream at different and subsequent points in the path of the electron stream and for deriving color difference signal information from the electron stream at other points than those points where the demodulating signals are introduced.

In one circuit for practicing the invention, the chrominance signal and a first demodulating signal having a first phase are introduced into the electron stream of an electron tube at an early point in the path of that electron stream; a color difference signal corresponding to the phase of the demodulating signal is thereupon produced at a subsequent control electrode. In the beam path beyond that control electrode, the electron stream has modulations representative of a chrominance signal, a first demodulating signal, and of a first color difference signal. A second demodulating signal which is used to modulate the electron stream in the beam path beyond the control electrode will produce current variation in an anode or collector which will include a group of higher frequency signals, namely, the chrominance signal and the first and second demodulating signals, and also both the first color difference signal and a second color difference signal relating to the second demodulating signal; the latter named two color difference signals will combine at the anode to form a third color difference signal.

A demodulating device of the present invention may also be employed for changing the relative signal strength of each of a plurality of color difference information modulations in a chrominance signal, by demodulating power representative of side frequencies relating to that color difference signal into a load coupled to an intermediate point in the path of an electron flow which is modulated to provide the signal interactions required for the demodulation; the altered chrominance signal is thereupon derived from a further point in the electron flow. Color balance may be achieved by providing predetermined levels of power demodulation for each of a plurality of color difference signals at different points in the electron flow path to provide the different ratios of color difference information power required for color balance, in the chrominance signal developed at a collector or anode electrode.

Other and incidental objects of the invention will be understood upon the reading of the following specification and a study of the drawings wherein:

Figure 1 is a diagram of a color television receiver which includes a schematic diagram of a single-tube two-color demodulator 10 of the present invention. Before discussing in detail the operations of the single-tube two-color demodulator 10, consider first the over-all operation of the color television receiver.

Figure 1:
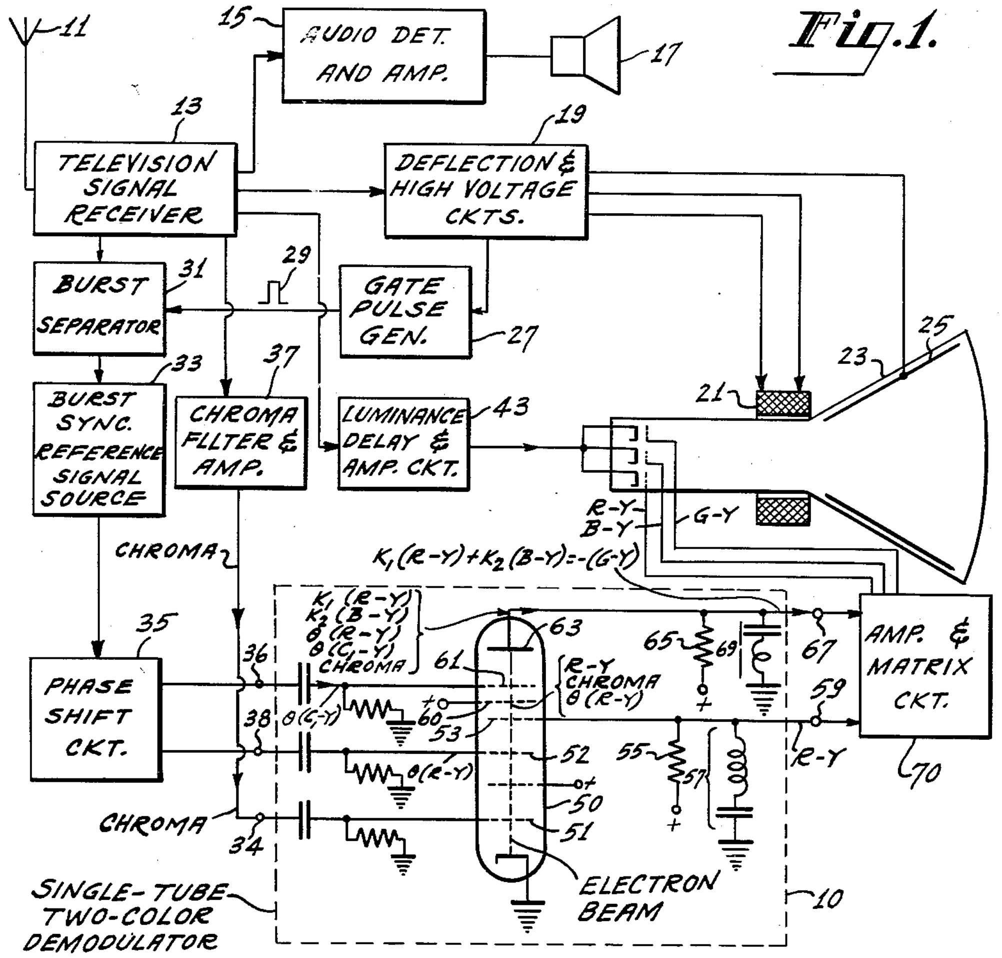
Figure 1 is a diagram of a color television receiver which includes a single-tube two-color demodulator of the present invention.

An incoming signal from a broadcast transmitter is received at the antenna 11 and applied to the television signal receiver 13. The television signal receiver 13 is a circuit which processes the incoming signal to produce a demodulated color television signal. The demodulated color television signal includes the luminance signal, the chrominance signal, picture deflection synchronizing signals, color synchronizing bursts, and an audio-modulated frequency-modulated carrier which is transmitted 4½ megacycles removed from the picture carrier in the incoming signal.

The color television signal is applied to the audio detector and amplifier 15 which demodulates the audio information, amplifier the demodulated audio information, and applies the amplified audio information to the loudspeaker 17.

The color television signal is also applied to the deflection and high voltage circuits 19 which separate the picture deflection synchronizing signals from the color television signal, and develop horizontal and vertical deflection signals which are applied to the yokes 21 of the color kinescope 23. In addition, the deflection and high voltage circuits 19 develop a high voltage which is applied to the ultor 25 of the color kinescope 23.

The deflection and high voltage circuits 19 also energize the gate pulse generator 27 which produces a gate pulse 29 during each retrace interval. The gate pulse 29 has a duration time which is substantially equal to the duration time of the color synchronizing bursts and which occurs in time coincidence with the time interval during which the bursts occur. The gate pulse generator 27 normally consists of an auxiliary winding on a transformer of the deflection and high voltage circuits 19 in many color television receivers; however, the gate pulse generator 27 may also comprise a circuit including a multivibrator which is responsive to horizontal synchronizing pulses.

The color television signal and the gate pulse 29 are applied to the burst separator 31 which acts as a gate circuit whose gate is opened only during the duration time of the color synchronizing bursts in the color television signal. The color synchronizing bursts are therein separated from the color television signal and applied therefrom to the burst synchronized reference signal source 33.

The burst synchronized reference signal source is a signal generator capable of developing a reference signal having a frequency related to the burst frequency and having a phase which is accurately maintained in synchronism with a phase prescribed by the bursts. The burst synchronized reference signal source 33 may consist of a ringing circuit, or a burst-synchronized injection-locked oscillator, or an automatic-frequency-control oscillator circuit involving an oscillator whose frequency is controlled by a reactance tube which is in turn controlled by a phase discriminator which compares the phases of the oscillator output and of the bursts and which applies a suitable control signal to the reactance tube.

The burst synchronized reference signal source 33 applies the burst synchronized reference signal to the phase shift circuit 35. The phase shift circuit applies a plurality of demodulating signals of proper phase to the single-tube two-color demodulator 10. A chrominance signal or chroma signal which is derived from the color television signal by the chroma filter and amplifier 37 is also applied to the single-tube two-color demodulator 10. The single-tube two-color demodulator 10 thereupon develops a pair of color difference signals. The aforementioned pair of color difference signals is applied to the amplifier and matrix circuit which develops a third color difference signal from the pair of color difference signals and produces in its output a corresponding trio of color difference signals of the type $R-Y$, $B-Y$ and $G-Y$ color difference signals where R, G, and B denote red, green, and blue, respectively, and Y denotes the luminance signal.

The $R-Y$, $B-Y$, and $G-Y$ color difference signals are applied to the control grids of the electron guns of the color kinescope 23, which control the light output of the color kinescope 23 at the colors corresponding to these color difference signals.

When the color television signal is not subjected to processes of synchronous demodulation, the color television signal comprise principally a luminance signal. The luminance signal or Y signal is applied through the luminance delay and amplifier circuit 43 to the cathodes of the color kinescope 23. In each of the electron guns of the color kinescope 23, the luminance signal is combined with the color difference signal applied to the control grid of that electron gun so that the corresponding component color signal is introduced into the electron beam issuing from that electron gun. It is to be appreciated that alternatively, the luminance signal may be combined with each color difference signal in a circuit or circuits external to the color kinescope, with the resulting component color signals thereupon utilized to drive the electron guns of the color kinescope 23.

*Single-tube two-color demodulators of the invention*

The single-tube two-color demodulator 10 of Figure 1 operates to provide a pair of color difference signals according to the present invention, in the following manner:

The chrominance signal or chroma is applied by way of the chroma filter and amplifier 37 to the control grid 51 of the multi-grid tube 50. The electron stream issuing from the cathode of tube 50 and passing through the control grid 51 is thereupon modulated by the chrominance signal. The modulated electron stream passes through a screen grid and then through a control grid 52 which is modulated by a demodulating signal. In a typical operation of the single-tube two-color demodulator 10, the control grid 52 is modulated by a demodulating signal having the phase of the $R-Y$ color difference signal in the chrominance signal; the $R-Y$ phase demodulating signal, denoted in the drawings as $\theta(R-Y)$ is furnished by the phase shift circuit 35. The chrominance signal is mixed with the demodulating signal to produce an $R-Y$ signal in the electron stream which is extracted from the electron stream by the grid 53 and developed therefrom across the grid load 55. Since the signal information developed across the grid load 55 will also include the chrominance signal, a series resonant circuit 57, which is resonant at the frequency of the chrominance signal, is connected between the grid 53 and ground; color difference signal information corresponding principally to only $R-Y$ information will thereupon be developed at the output terminal 59.

At a point following the grid 53 from which the $R-Y$ color difference signal is extracted and which is shielded from the grid 53 by grid 60, the electron stream passes through a control grid 61. In the region between the grid 53 and the control grid 61, the electron stream includes modulations representative of the chrominance signal or chroma (wherein the $R-Y$ color difference signal information will have reduced amplitude level), the $R-Y$ color difference signal and the demodulating signal $\theta(R-Y)$. A demodulating signal having the phase of an arbitrary color difference signal $C_1-Y$ in the chrominance signal and denoted as $\theta(C_1-Y)$, is applied to the control grid 61; the demodulating signal $\theta(C_1-Y)$ will thereupon combine with the $R-Y$ phase demodulating signal $\theta(R-Y)$ to form a resultant modulation in the electron stream having a phase which is a function of both the phases of $\theta(R-Y)$ and $\theta(C_1-Y)$ and of their amplitudes. This resultant modulation will interact with the chrominance signal information in the electron stream to reproduce the color difference signal information, at the anode 63, which occurs in the chrominance signal at the phase of the resultant.

Figure 2:
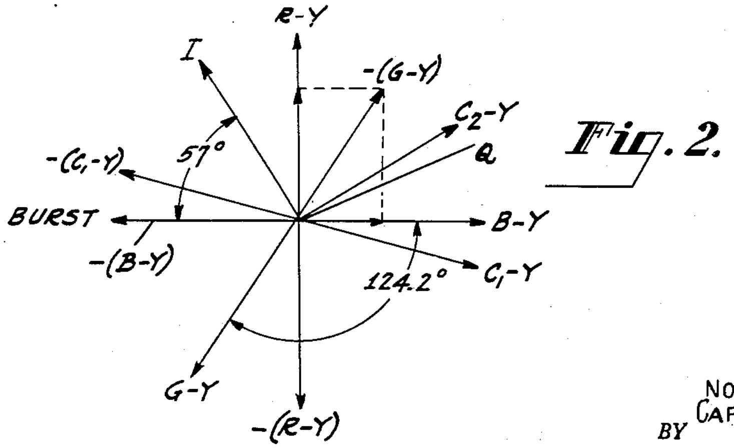
Figures 2 and 7 are vector diagrams relating information corresponding to various color difference signals to the phases of the chrominance signal.

Figure 2 is a vector diagram illustrating various phases at which different color difference signal information occurs in the chrominance signal relative to burst phase. As is seen from Figure 2, the $R-Y$, $B-Y$ and $G-Y$ color difference signals have phases which lag the burst phase by 90°, 180°, and 304.2°, respectively. If the $C_1-Y$ color difference signal is chosen at a phase which lags the phase of the $B-Y$ color difference signal as shown, then a resultant demodulating signal having the phase of the $-(G-Y)$ color difference signal may be produced from a combination of $\theta(R-Y$ and $\theta(C_1-Y)$ so that $-(G-Y)$ color difference signal information will be developed at the anode 63 of the multi-grid tube 50.

It is to be appreciated that the precise phase at which the $C_1-Y$ phase demodulating signal is chosen to lag the $R-Y$ phase, will depend upon the magnitude of the $R-Y$ phase demodulating signal $\theta(R-Y)$ occurring in the electron stream at the point between the grid 53 and the control grid 61, and the amplitude of the $C_1-Y$ phase demodulating signal $\theta(C_1-Y)$ which is applied to the grid 61.

The signal information developed at the anode 63 will also include contributions of the $R-Y$ color difference signal information denoted as $k_1(R-Y)$, a contribution of $B-Y$ color difference signal information denoted as $k_2(B-Y)$, and a sufficient amount of $R-Y$ color difference signal information of negative polarity to cancel out the $R-Y$ color difference signal information which is developed in the electron stream in between the grid 53 and the anode 63. The $R-Y$ and $B-Y$ color difference signals at amplitude levels $k_1$ and $k_2$ are combined at the anode 63 to produce a $-(G-Y)$ color difference signal. The $-(G-Y)$ color difference signal is developed across the anode load 65 and therefrom to the output terminal 67. A series resonant circuit 69, which is resonant at the frequency of the chrominance signal and demodulating signal information is coupled from the anode 63 to ground so that only demodulated $-(G-Y)$ color difference signal information is produced at the terminal 67.

Figures 3, 4, 5:
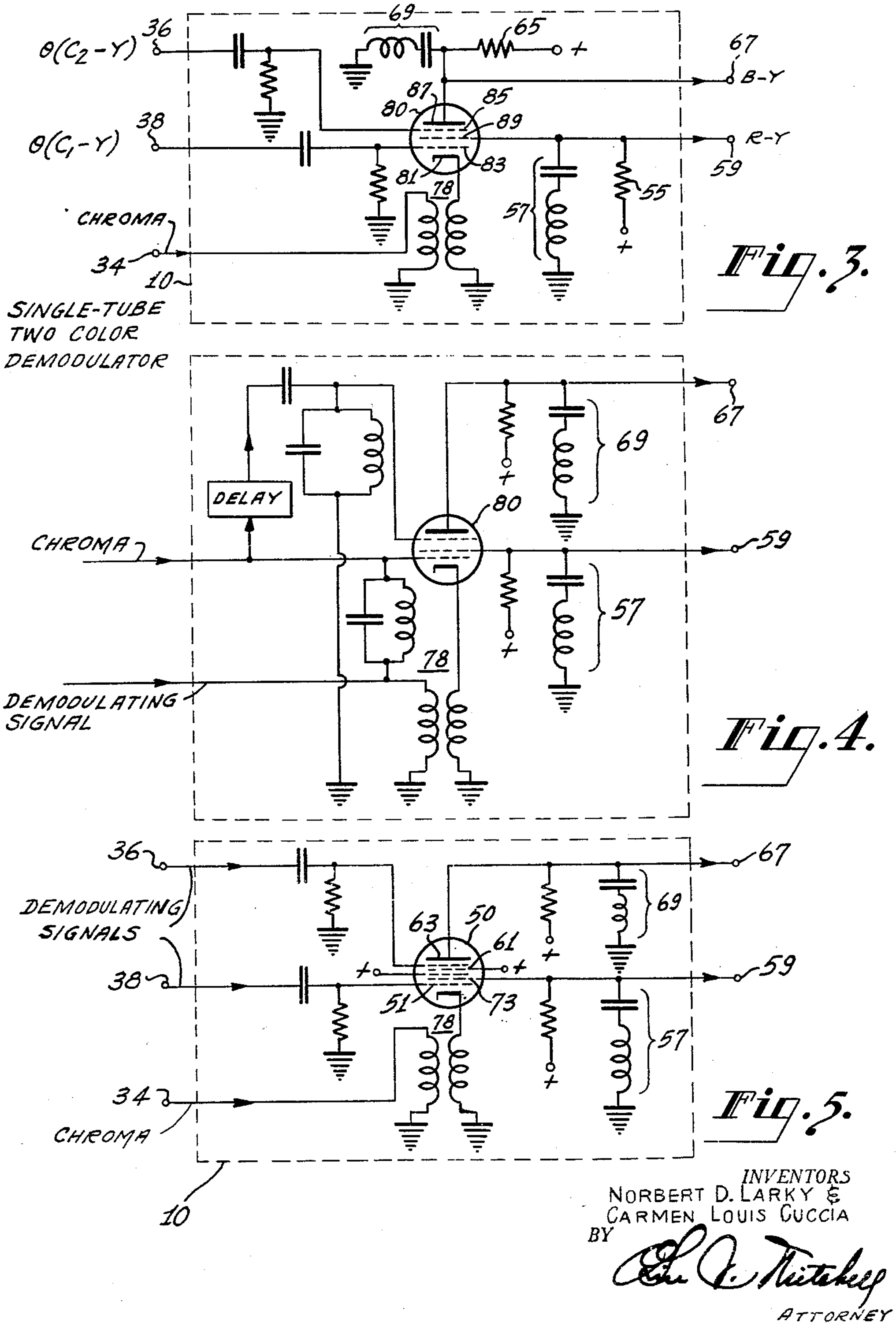
Figures 3–6 and 8 are schematic diagrams of different forms of single-tube multi-color demodulators of the present invention.

Figure 3 is a schematic diagram of a single-tube two-color demodulator which uses a pentode 80.

A chrominance signal is applied by way of terminal 34 to a transformer 78 which develops the chrominance signal between the cathode 81 of the pentode 80 and ground. Demodulating signals having the phases $\theta(C_1-Y)$ and $\theta(C_2-Y)$ are applied to the first and third grids 83 and 85 by way of terminals 38 and 36, respectively. The third grid 85 is a space-charge distribution grid which controls the distribution of space charge between the anode 87 and the screen grid 89. When the potential of the third grid 85 is relatively low, most of the electrons will be turned back to the screen grid 89. When the potential of the third grid 85 becomes increasingly positive, more and more current passes to the anode 87 and less current passes to the screen grid 89.

As a result of the interaction with the chrominance signal information in the electron stream by the demodulating signals applied to the first grid 83 and the third grid 85, a color difference signal corresponding to $k_2(C_2-Y)-k_1(C_1-Y)$ will be developed at the screen grid 89 and therefore at the output terminal 59; and a color difference signal corresponding to $$k_3(C_1-Y)+k_4(C_2-Y)$$

will be developed at the anode 87 and therefore at the output terminal 67. $k_1$, $k_2$, $k_3$ and $k_4$ are proportionality constants. If $C_1-Y$ and $C_2-Y$ have those phases of the chrominance signals illustrated in the vector diagram of Figure 2, proper choice of magnitudes for $k_1$ and $k_2$ will develop and $R-Y$ color difference signal, and proper choice of magnitudes of $k_3$ and $k_4$ will cause the development of a $B-Y$ color difference signal at the output terminal 67.

The circuit of Figure 3 has been shown to be capable of using the above-mentioned demodulating signals to produce an $R-Y$ and $B-Y$ color difference signal. Other pairs of demodulating signals may be utilized to produce a wide variety of different pairs of color difference signals at the output terminals 59 and 67. The magnitudes of the demodulated pair of color difference signals may be controlled by properly proportioning the magnitude of the anode load 65 and the screen grid load 55 and the voltages applied thereto.

Figure 4 is a schematic diagram of another form of single-tube, two-color demodulator 10 which is similar to the circuit of Figure 3 though differently operated. In the single-tube, two-color demodulator 10 of Figure 4, the demodulating signal is applied by way of the transformer 78 between the cathode of the pentode 80 and ground. The chrominance signal is applied to the first grid 83 and also to the third grid 85; the chrominance signal also applied to the third grid 85 is at a relative phase which is delayed relative to the relative phase of the chrominance signal which is applied to the first grid 83. The demodulating signal developed at the cathode of the pentode 83 is phased relative to the relative phases of the chrominance signals applied to the first grid 83 and the third grid 85 to cause different color difference signals to be developed at the output terminals 67 and 59.

Figure 5 is a schematic diagram of a multi-grid tube 50 which illustrates a different type of circuit connection than that employed for the circuit of Figure 3.

The chrominance signal is applied by way of terminal 34 to the transformer 78 and therefrom between the cathode 71 and ground. Differently phase demodulating signals are applied to the first control grid 51 and the last grid 61. Shielding is now provided between the last grid 61 and the screen grid 73, the latter-named grid being that grid from which the color difference signal, corresponding to color information in the chrominance signal in the phase of the demodulating signal applied to the first control grid 61, is produced. The color difference signal information produced at the anode 63 and therefrom at the output terminal 67, will therefore be a function of both the color difference signal information demodulated from the chrominance signal by the action of the demodulating signal applied to the last grid 61 and to the color difference signal information introduced into the electron stream following the screen grid 73.

The circuit of Figure 5 is also similar to the circuit of Figure 1 with the exception of the fact that the applying of the chrominance signal between the cathode and ground rather than to a control grid permits more flexibility of connection of the circuit with particular regard to the points at which the various demodulating signals are introduced into the electron stream.

*A single-tube, three-color demodulator of the invention*

Figure 6:
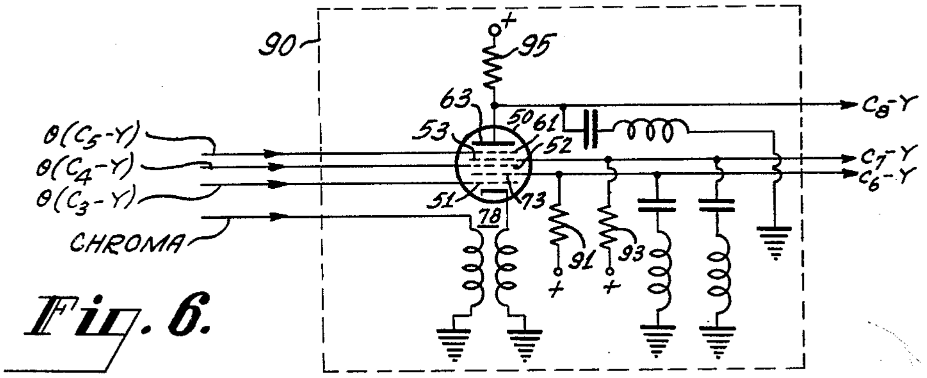

Figure 6 is a schematic diagram of a single-tube, three-color demodulator 90 which, responsive to a chrominance signal and a trio of demodulating signals introduced at different points in the electron stream, produces a trio of different color difference signals which may be derived from different points in that electron stream.

The single-tube, three-color demodulator 90 of Figure 6 illustrates one form of the present invention where the chrominance signal is applied to the transformer 78 and developed between the cathode and ground of a multi-grid tube 50. Demodulating signals having the arbitrary phases $\theta(C_3-Y)$, $\theta(C_4-Y)$, and $\theta(C_5-Y)$ are applied to the first grid 51, the third grid 52, and the fifth grid 61, respectively. Resistive loads 91, 93, and 95 are coupled to the second grid 73, the fourth grid 53, and the anode 63 of the multi-grid tube 50, respectively. The single-tube, three-color demodulator 90 of Figure 6 will operate according to principles already described in connection with the circuit in Figure 3 to produce color difference signals $C_6-Y$, $C_7-Y$, and $C_8-Y$ at the resistive loads 91, 93, and 95, respectively. The color difference signals $C_6-Y$, $C_7-Y$, and $C_8-Y$ are formed according to different proportions of color difference signals derived from the applied demodulating signals as follows:

$$C_6-Y=k_5(C_3-Y)-k_6(C_4-Y)$$
$$C_7-Y=k_7(C_3-Y)+k_8(C_4-Y)-k_9(C_5-Y)$$
$$C_8-Y=k_{10}(C_3-Y)+k_{11}(C_4-Y)+k_{12}(C_5-Y)$$

Figures 7, 8:
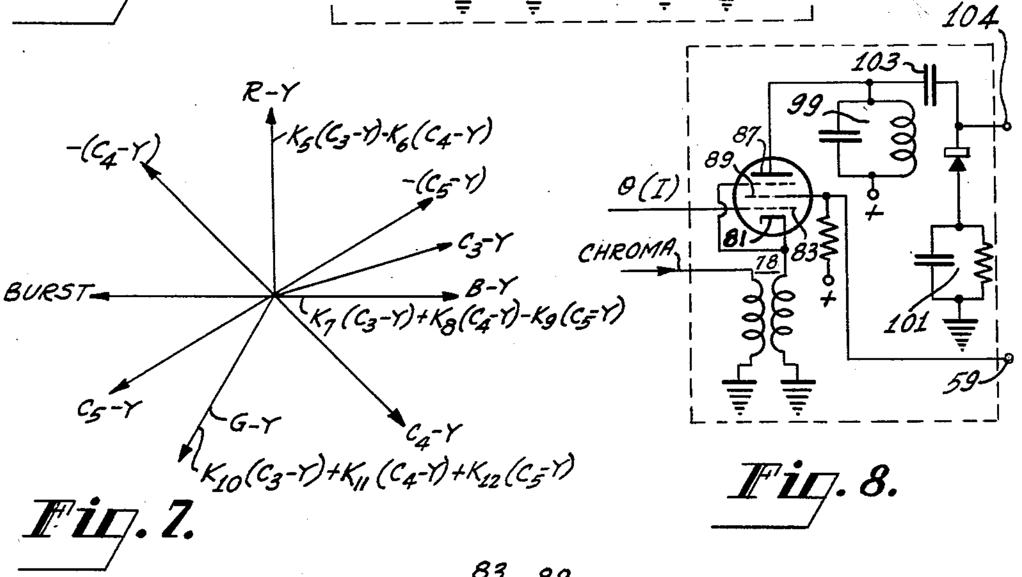

By proper choice of the actual phases of the demodulating signals $\theta(C_3-Y)$, $\theta(C_4-Y)$, and $\theta(C_5-Y)$ and the magnitudes of the resistive loads 91, 93, and 95 and the voltages applied thereto, the color difference signals $C_6-Y$, $C_7-Y$, and $C_8-Y$ will correspond to any desired trio of color difference signals in the chrominance signal. A typical choice of demodulating signal angles and the color difference signals developed thereby will be discussed as follows:

Figure 7 is a vector diagram illustrating the phases of typical color difference signals corresponding to $C_3-Y$, $C_4-Y$, and $C_5-Y$ in the chrominance signal which may be combined in prescribed polarities and amplitudes to produce an $R-Y$, $B-Y$, and $G-Y$ color difference signal.

As can be noted from Figure 7, the $C_3-Y$ vector is located in the quadrant between $R-Y$ and $B-Y$ and the $C_4-Y$ and $C_5-Y$ vectors are located in the regions of phase between the $B-Y$ and $G-Y$ vectors and between the $G-Y$ and the burst phase vector, respectively.

The color difference signal which will be produced at the second grid 73 of the multi-grid 50 will be made up of contributions of $k_5(C_3-Y)$ and $k_6(C_4-Y)$ color difference signal information; by properly proportioning $k_5$ and $k_6$, these color difference signals combine to yield an $R-Y$ color difference signal. The color difference signal information developed at the fourth grid 53 will be a combination of information relating to $C_3-Y$, $C_4-Y$ and $-(C_5-Y)$ color difference signals.

The $C_3-Y$ and $C_4-Y$ vectors of Figure 7, having proportionality constants $k_7$ and $k_8$, respectively, will provide color difference signal information along a vector which has a phase between the $B-Y$ and $C_4-Y$ phase and which therefore includes some $-(R-Y)$ color difference signal information. The $-(C_5-Y)$ color difference signal is proportioned to have a constant $k_9$ which will cancel at least the $-(R-Y)$ color difference signal information and cause a final resultant vector combination so that a $B-Y$ color difference signal is produced at the fourth grid 53.

In like fashion, proper choice of magnitudes of $k_{10}$, $k_{11}$, and $k_{12}$ will cause the $C_3-Y$, $C_4-Y$, and $C_5-Y$ vectors to yield color difference signal information at the $G-Y$ phase and therefore produce a $G-Y$ color difference signal at the anode 63.

The single-tube, three-color demodulator of Figure 6 is operative whereby each grid from which a color difference signal is derived, is affected by an adjacent grid which has space charge distribution control properties. In a multi-grid tube where there is isolation and shielding between various grids where the demodulating signals are applied and where the demodulating signals are derived, the phases of the demodulating signals to produce a plurality of color difference signals at a grid will be dependent upon the color difference signal information induced in that grid by information introduced into the electron stream by preceding grids and not by subsequent grids.

*A two-color demodulator using a single demodulating signal*

Figure 8 is a circuit diagram of a two-color demodulator which requires only a single demodulating signal to produce a pair of demodulated color difference signals. In the circuit of Figure 8 the chrominance signal is applied, for example, to the transformer 78 and therefrom developed between the cathode of the pentode 80 and ground. A demodulating signal of prescribed phase is applied to the first grid 83. The interaction of the demodulating signal and of the chrominance signal in the electron stream between the cathode 81 and the screen grid 89 will be to produce a color difference signal, corresponding to information occurring in the chrominance signal at the phase of the demodulating signal, at the screen grid 89, and therefore at the output terminal 59.

If the amplitude of the demodulating signal is of proper phase and magnitude upon being applied to the first grid 83, the chrominance signal information developed in the electron stream after it passes through the screen grid 89 will include color difference signal information relating to the phase of the demodulating signal which will be of negligible amplitude.

Consider at this point, characteristics of the chrominance signal which are pertinent to an understanding of the presently described circuit. Many of the circuits used to develop a chrominance signal in a color television transmitter employ means to develop a first subcarrier modulated by so-called I signal information; this first subcarrier is then combined with a second subcarrier which is modulated by so-called Q signal information. The I signal is an orange-cyan color-axis information signal; the Q signal describes color information along the green-purple color axis. The subcarriers which are respectively modulated by the I and Q signals are separated in phase by 90° with the phase of the I-signal modulated subcarrier lagging the burst phase by 57°. A chrominance signal, thus formed, is capable of yielding any of the color difference signals illustrated in Figures 2 and 7 at the phases shown therein.

In one manner of operation of the circuit of Figure 8, let the demodulating signal applied to the first grid 83 have the phase of the I signal. The amplitude of the I demodulating signal, denoted in the drawing as $\theta$(I) is proportioned so that the majority of the I color difference signal information is developed at the screen grid 89 and therefore at the output terminal 59. The chrominance signal in the electron stream passing from the screen grid 89 to the anode 87 will thereupon comprise principally a Q-signal modulated subcarrier, in addition to including demodulated I signal information. By using a resonant anode load 99 which is resonant at the Q signal subcarrier frequency and which has a bandwidth sufficiently wide to develop the entire Q signal modulated subcarrier but not sufficiently wide to provide a load for the demodulated I signal, a signal comprising substantially the Q-signal modulated subcarrier will be developed across the resonant circuit 99.

A rectifier 100 and a resistance-condenser network 101 are connected in series and coupled by way of the bypass condenser 103 across the resonant circuit 99. The rectifier 100 and the resistance-condenser circuit 101 will detect the envelope of the Q-signal modulated subcarrier and produce the detected Q signal at the output terminal 103.

It is to be understood that the present invention shown in Figure 8 may be operated to develop other pairs of color difference signals.

*Demodulating color balance control tubes of the invention*

Figure 9:
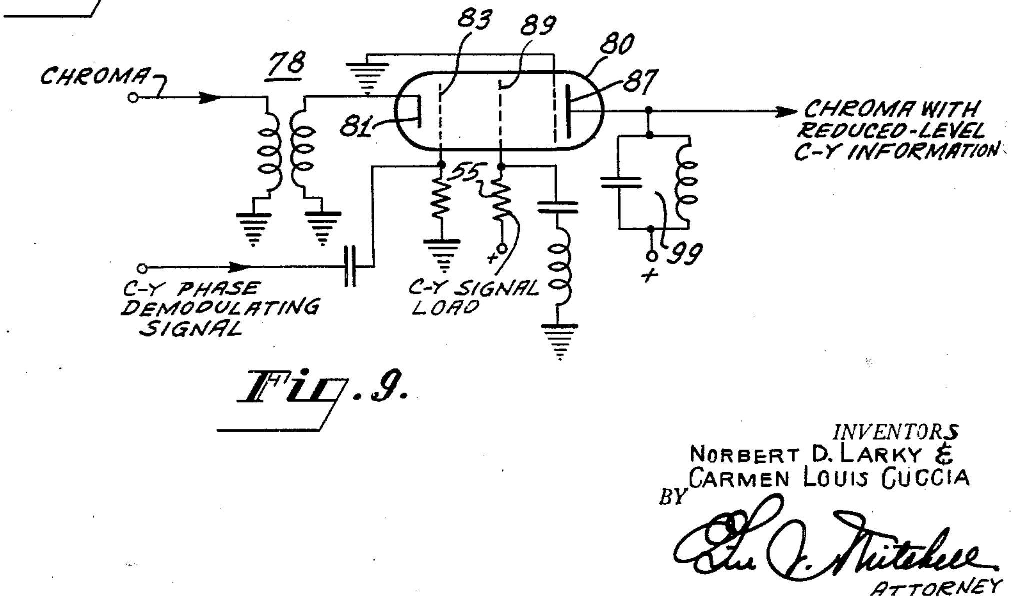
Figure 9 is a schematic diagram of a circuit of the present invention for altering the signal strength of a color difference signal modulation in the chrominance signal.

Figure 9 is a schematic diagram of a single-tube color demodulator of the present invention for altering the relative amplitude level of information relating to a selected color difference signal in the chrominance signal. Information signals relating to $R-Y$, $B-Y$, and $G-Y$ color difference signals are transmitted at different signal levels in the chrominance signal. The relative signal strengths of the information signals relating to the $R-Y$, $B-Y$, and $G-Y$ color difference signals are included in the chrominance signal according to the ratio .877:.493:1.423. In many color television circuits, one of which will be described in the specification to follow, it is desirable that the signal strength or signal level of one or more of the information signals occurring at different phases in the chrominance signal be changed in signal strength. Circuits of the invention perform this function in unique and novel fashion.

Consider, for example, the circuit in Figure 9 where the chrominance signal is applied by way of the transformer 78 between the cathode 81 of the tube 80 and ground. A synchronous demodulating signal having a desired phase of the chrominance signal, say an arbitrary $C-Y$ phase of the chrominance signal, is applied to the first grid 83, with the $C-Y$ color difference signal thereupon developed across the resistive load 55 of the screen grid 89. The signal strength of the $C-Y$ color difference signal information in the chrominance signal information remaining in the electron stream after the screen grid 89 will be reduced in amplitude in accordance with the amplitude of variation of the $C-Y$ phase demodulating signal.

The chrominance signal with reduced $C-Y$ color difference signal information and a demodulated $C-Y$ color difference signal will be induced at the anode 87 of the tube 80. A resonant circuit load 99 is coupled to the anode 87; the resonant circuit 99 is resonant over a frequency range which includes the frequency range of the chrominance signal. Therefore, substantially no $C-Y$ color difference signal information will be developed across the resonant circuit 99; only a chrominance signal in which the signal strength of the $C-Y$ color difference signal information has been reduced will be developed there.

A demodulator for achieving color balance in a chrominance signal may be used in a color television receiver which uses kinescope sampling of the chrominance signal and which causes information relating to each of a trio of colors to be reproduced by successive strips of color phosphors of different color light emissivity.

Figures 10, 11:
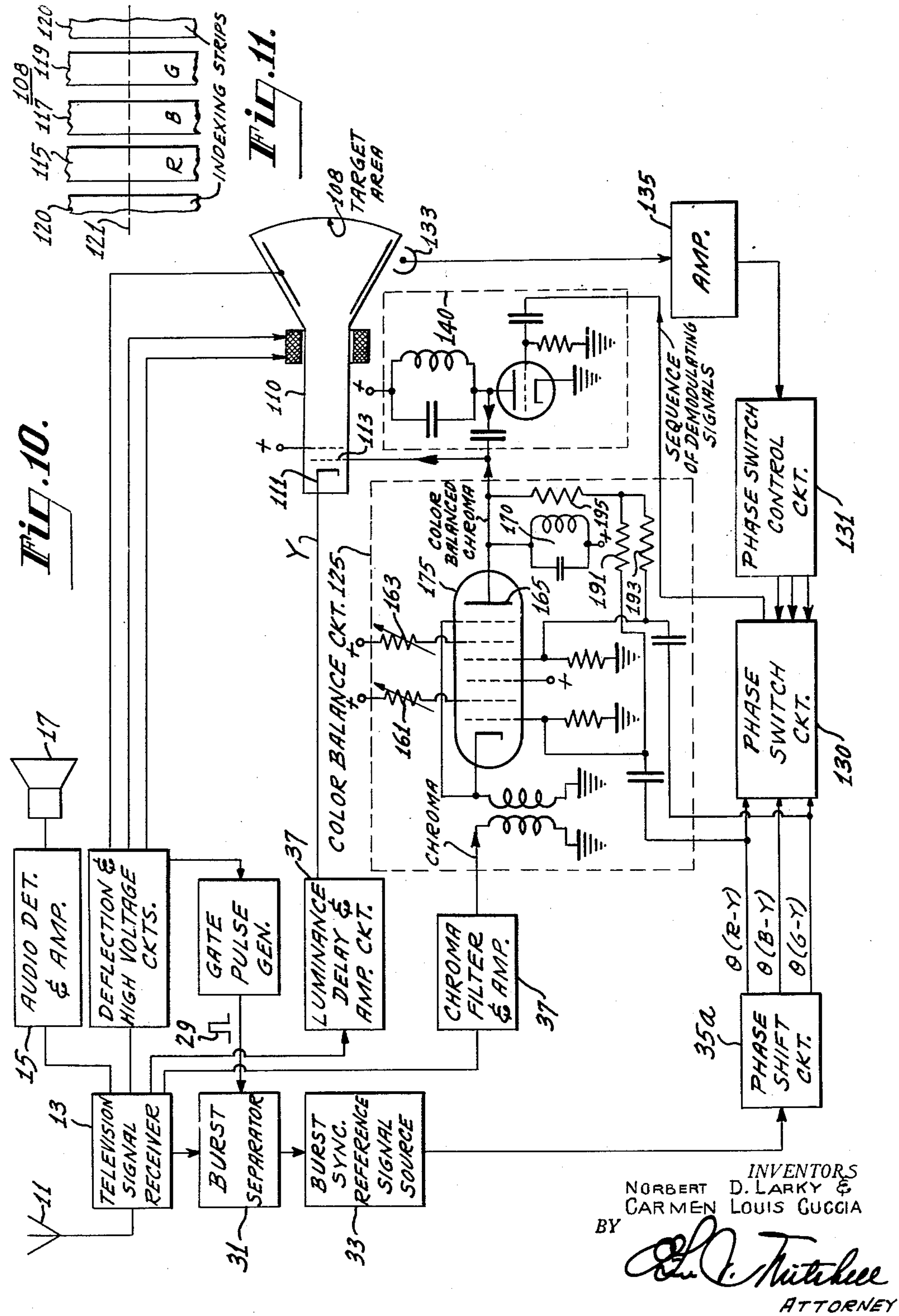
Figure 10 is a diagram of a color television receiver using a color balance circuit of the invention.

A color television receiver which utilizes a color balance device of the present invention is shown in Figure 10. The circuits of the color television receiver which perform the same functions as those circuits previously described in the color television receiver circuit of Figure 1, are assigned the same numerals.

The kinescope 110 is of the type which utilizes a single electron gun having a cathode 111 and a control grid 113. The target area of the kinescope 110 consists of an array of vertically disposed color phosphor strips. A typical array of strips is shown in Figure 11 wherein a set of phosphor strips, namely, a red-light-emitting phosphor strip, a blue-light-emitting phosphor strip 117 and a green-light-emitting phosphor strip 119 are arrayed side by side to form a trio. Each trio is preceded and followed by an indexing strip 120, which when bombarded by electron beam, produces ultraviolet light which is detectable at low level by a photoelectric cell. The electron beam follows a path 121 which impinges first on an indexing strip 120, then traverses each of the color phosphor strips in the trio in succession, impinges another indexing strip 120, impinges on the next trio of color phosphor strips, and so on. The use of the indexing strips 120 provides means for establishing both registration and synchronization of the color information imparted into the electron beam of the kinescope 110 relative to the instantaneous position of the electron beam as it scans across the target area.

As in the case of the color television receiver of Figure 1, the luminance signal is processed in the luminance delay and amplifier 37 of the circuit of Fig. 10. The amplified luminance or Y signal is thereupon applied to the cathode 111. The chrominance signal is filtered from the color television signal and amplified in the chroma filter and amplifier 37 and applied to the control grid 113 of the kinescope 110 by way of the color balance circuit 125 of the present invention.

The reference signal from the burst synchronized reference signal source 33 is applied to the phase shift circuit 35a which in turn develops a trio of demodulating signals related respectively to information at the $R-Y$, $B-Y$, and $G-Y$ phases in the chrominance signal and denoted in the drawing as $\theta(R-Y)$, $\theta(B-Y)$, and $\theta(G-Y)$. Each of the aforementioned trio of demodulating signals is applied to the phase switch circuit 130.

The phase switch circuit 130 is controlled by the phase shift control circuit 131 which, responsive to signals derived from the impinging of the electron beam on the indexing strips 120, these signals being detected by the photoelectric cell 133 and amplified in the amplifier 135. Responsive to the above signals, the phase switch circuit 130 produces a sequence of demodulating signals having the phases of the $R-Y$, $B-Y$, and $G-Y$ color difference signals; each demodulating signal in the sequence is produced during the time when the electron beam impinges on the phosphor strip which produces corresponding light output. The sequence of different demodulating signals is provided from the phase switch circuit 130 to the amplifier 140 and therefrom to the control grid 113 of the kinescope 110.

The electron beam issuing from the cathode 111 in the kinescope 110 will contain luminance of Y signal information. The chrominance signal and the sequence of demodulating signals which are synchronized to the movement of the electron beam, are both applied to the control grid 113 to produce demodulation of a properly synchronized sequence of color difference signals into the electron beam; each of the sequence of color difference signals is combined with the luminance signal in the electron beam with the resulting component color information used to control the light output from the target area.

For reasons already discussed above, the color balance circuit 125 is used to control the color balance of the color difference signal information occurring in the chrominance signal. This is of particular use in a color television receiver of the type shown in Figure 10 since each of the color phosphor strips 115, 117, and 119 will have different light-output efficiency responsive to being bombarded by the scanning electron beam. Since the $R-Y$ and $G-Y$ color difference signals have much greater signal strength than the $B-Y$ color difference signal in the chrominance signal, the circuit of the invention in Figure 10 is operated, by way of illustration, to decrease the relative amplitude levels of the $R-Y$ and $G-Y$ color difference signals so that the color image reproduced on the target area will have proper color balance.

In the color balance circuit 125 of the present invention, $R-Y$ and $G-Y$ phased demodulating signals are applied to the electron stream of the tube 175 at different points in the electron stream. Resistive loads 161 and 163 of controllable resistance, are coupled to control electrodes at other points in the electron stream with the resistance controlled to cause the $R-Y$ and $G-Y$ color difference signal information in the chrominance signal in the electron stream to be reduced according to a desired magnitude. The information in the electron stream which reaches the anode 165 of the tube 130 will include not only the color balanced chrominance signal but also color difference signal information derived from the $R-Y$ and $G-Y$ color difference signals which are demodulated in the tube 175 and also demodulating signal information. By using a resonant load 170 which is resonant and which provides high impedance only in the frequency range of the chrominance signal, only the color balanced chrominance signal information and the demodulating signal information is developed across the resonant load 170. The demodulating signal information reaching the anode of tube 175 will be 180° out of phase with the demodulating signal information applied to the control grids of that tube. The resistance network made up of resistors 191, 193 and 195 provides demodulating signal information to the anode of tube 175 to cancel there any demodulating signal information developed there by the electron stream.

The color balanced chrominance signal is thereupon applied to the control grid 113 of the kinescope 110.

Having described the invention, what is claimed is:

1. In combination: a circuit to provide a chrominance signal wherein different components representative of selected color difference signals occur at different phases and are capable of being demodulated at said different phases, an electron flow device having an electron flow along a prescribed path to an output electrode, means coupled between said circuit and said electron flow device to introduce modulations representative of said chrominance signal into said electron flow, said electron flow device having an intermediate electrode interposed in a region of said prescribed path of electron flow between said output electrode and the point of modulation introduction, means coupled to said intermediate electrode of said electron flow device to demodulate color difference signal information occurring at a selected phase of said chrominance signal from said region of said prescribed path of electron flow whereby a modified chrominance signal is available at said output electrode, and means coupled to said output electrode to utilize said modified chrominance signal.

2. In combination: a circuit to provide a chrominance signal wherein different components representative of selected color difference signals occur at different phases and are capable of being demodulated at said different phases, an electron flow device having an electron flow along a prescribed path to an output electrode and having a plurality of control grids, means coupled between said circuit and said electron flow device to introduce modulations representative of said chrominance signal into said electron flow, means coupled to said plurality of control grids to demodulate color difference signal information occurring at a selected phase of said chrominance signal at one of said plurality of control grids, whereby a modified chrominance signal is available at said output electrode, and means coupled to said output electrode to utilize said modified chrominance signal.

3. In combination: a circuit to provide a chrominance signal wherein different components representative of each of a plurality of color difference signals occur at different phases, each of said plurality of color difference signals capable of being demodulated by demodulation at a corresponding phase of said chrominance signal, an electron flow device having an electron flow along a prescribed path to an output electrode, said prescribed path of electron flow including a first region within which said electron flow originates and a second region between said first region and said output electrode, said electron flow device having an input electrode disposed in said first region and an intermediate electrode interposed in said second region of said path of electron flow, means coupled to said chrominance signal providing circuit and to said input electrode for introducing modulations representative of said chrominance signal into said electron flow, means coupled to said intermediate electrode of said electron flow device for demodulating color difference signal information occurring at a first phase of said chrominance signal from said second region of said prescribed path of electron flow preceding said output electrode, and means coupled to said output electrode for demodulating color difference signal information corresponding to information occurring in said chrominance signal at a second phase different from said first phase at said output electrode, said first and second phases not being opposite phases of the same information.

4. In combination: a circuit to provide a chrominance signal wherein different components representative of each of a plurality of color difference signals occur at different phases, each of said plurality of color difference signals capable of being demodulated by demodulation at a corresponding phase of said chrominance signal, an electron flow device having an electron flow along a prescribed path to an output electrode, said prescribed path of electron flow including a first region within which said electron flow originates, a second region between said first region and said output electrode, and a third region between said second region and said output electrode, said electron flow device having an input electrode disposed in said first region, a first intermediate electrode interposed in said second region, and a second intermediate electrode interposed in said third region of said path of electron flow, means coupled to said chrominance signal providing circuit and to said input electrode for introducing modulations representative of said chrominance signal into said electron flow, means coupled to said first intermediate electrode of said electron flow device for demodulating color difference signal information occurring at a first phase of said chrominance signal from said second region of said prescribed path of electron flow, and means coupled to said second intermediate electrode for demodulating color difference signal information corresponding to information occurring in said chrominance signal at a second phase different from said first phase from said third region of said path of electron flow, said first and second phases not being opposite phases of the same information.

5. In combination: a circuit to provide a chrominance signal wherein different components representative of selected color difference signals occur at prescribed signal strength at different phases, an electron flow device having an electron flow along a prescribed path to an output electrode, said electron flow device having an intermediate electrode interposed at a point in said prescribed path preceding said output electrode, demodulating means coupled to said intermediate electrode for deriving color difference signal information from said point in said prescribed path preceding said output electrode to alter the signal strength of components corresponding to said color difference signal in the chrominance signal modulations occurring in said electron flow between said first point in said prescribed path and said output electrode, and signal utilization means coupled to said output electrode to utilize said altered chrominance signal wherein the signal strength of said components corresponding to said color difference signal have been altered by said demodulating means.

6. In combination: a circuit to provide a chrominance signal wherein different components representative of selected color difference signals occur at prescribed signal strength at different phases, an electron flow device having an electron flow along a prescribed path to an output electrode, said electron flow device having a plurality of intermediate electrodes disposed at different points of said prescribed path preceding said output electrode, demodulating means coupled to said plurality of intermediate electrodes for deriving different color difference signal information from said different points in said prescribed path preceding said output electrode to alter the signal strength of components corresponding to each of said different color difference signal information in the chrominance signal modulations occurring in said electron flow between said points in said prescribed path and said output electrode, and signal utilization means coupled to said output electrode to utilize said altered chrominance signal wherein the signal strength of said components corresponding to said different color difference signal information has been altered by said demodulating means.

7. In a color television receiver adapted to receive a color television signal including a chrominance signal wherein occur modulations representative of different color difference signals at different phases of said chrominance signal relative to a reference phase, said color television signals also including color synchronizing bursts which occur during each retrace interval, said color synchronizing bursts indicating a reference phase relative to the phases of said chrominance signal, the combination of: an electron tube having a cathode, a plurality of control electrodes, and an anode, said control electrodes successively located between said anode and cathode, means to develop differently phased demodulating signals from said color synchronizing bursts, means to develop said chrominance signal between at least said cathode and said first control electrode of said electron tube, means to apply said differently phased demodulating signals to selected control electrodes of said electron tube, and means to derive different color difference signals corresponding to modulations occurring in said chrominance signal at the different phases of said demodulating signal from other control electrodes of said electron tube.

8. In a color television receiver adapted to receive a color television signal including a chrominance signal wherein occur modulations representative of different color difference signals at different phases of said chrominance signal relative to a reference phase, said color television signals also including color synchronizing bursts during each retrace interval, said color synchronizing bursts indicating a reference phase relative to the phases of said chrominance signal, the combination of: an electron tube having a cathode, a plurality of control electrodes, and an anode, said control electrodes successively located between said anode and cathode, means to develop differently phased demodulating signals from said color synchronizing bursts, means to develop said chrominance signal between at least said cathode and said first control electrode of said electron tube, means to apply said differently phased demodulating signals to be selected control electrodes of said electron tube, and means to derive a first color difference signal corresponding to modulations occurring at a first phase in said chrominance signal from a first of said control electrodes of said electron tube and a second color difference signal corresponding to modulations occurring at a second phase in said chrominance signal from a second of said control electrodes.

9. In a color television receiver adapted to receive a color television signal including a chrominance signal wherein occur modulations representative of different color difference signals at different phases of said chrominance signal relative to a reference phase, said color television signal also including color synchronizing bursts which occur during each retrace interval, said color synchronizing bursts indicating a reference phase relative to the phases of said chrominance signal, the combination of: an electron tube having at least a cathode, an anode, and a first and second control electrode successively located between said cathode and said anode, means to apply said chrominance signal to said cathode, means to derive a first and second demodulating signal corresponding to first and second phases of said chrominance signal from said color synchronizing bursts, means to apply said first and second demodulating signals to said first and third control electrodes, respectively, and means to derive from said second control electrode and said anode different color difference signals each formed by a combination of prescribed amplitudes and polarities of color difference signal information occurring in said chrominance signal at the phases of said first and second demodulating signals.

10. In a color television receiver adapted to receive a color television signal including a chrominance signal wherein occur modulations representative of different color difference signals at different phases of said chrominance signal relative to a reference phase, said color television signals also including color synchronizing bursts which occur during each retrace interval, said color synchronizing bursts indicating a reference phase relative to the phases of said chrominance signal, the combination of: an electron tube having a cathode, a plurality of control electrodes and an anode, means to apply said chrominance signal to said cathode of said electron tube, means to derive from said color synchronizing bursts a trio of demodulating signals which are phase synchronized by said color synchronizing bursts to different predetermined phases of said chrominance signal, means to apply said trio of demodulating signals to a trio of control electrodes of said electron tube which are interspersed by other control electrodes, and means to derive from said interspersed control electrodes and from said anode a trio of color difference signals each formed by a combination of different magnitudes and polarities of color difference signal information occurring in said chrominance signal at the different phases of said trio of demodulating signals.

11. In a color television receiver adapted to receive a color television signal including a chrominance signal wherein occur modulations representative of different color difference signals at different phases of said chrominance signal relative to a reference phase, said color television signals also including color synchronizng bursts which occur during each retrace interval, said color synchronizing bursts indicating a reference phase relative to the phases of said chrominance signal, the combination of: an electron tube having at least a cathode, a first and second control electrode and an output electrode, means to develop said chrominance signal between at least said cathode and said control electrode, means to derive from said color synchronizing bursts a demodulating signal having a phase which is phase synchronized to a prescribed phase of said chrominance signal, means to apply said demodulating signal to a control electrode substantially adjacent to said cathode, means to derive from said second control electrode which is positioned between said first control electrode and said anode a first color difference signal which corresponds to color information corresponding to the modulations occurring in said chrominance signal at the phase of said demodulating signal and to develop an altered chrominance signal at said anode which has the signal strength of the modulations relating to said first color difference signal reduced to a prescribed level, a detector circuit coupled to said output electrode to detect the envelope variations of the altered chrominance signal obtained therefrom, said detector circuit thereby producing a second color difference signal corresponding to color information in said chrominance signal which is not reduced in signal strength by the developing of the first color difference signal at said second output electrode.

12. In a color television receiver adapted to receive a color television signal including a chrominance signal wherein occur modulations representative of different color difference signals at different phases of said chrominance signal relative to a reference phase, said color television signals also including color synchronizing bursts which occur during each retrace interval, said color synchronizing bursts indicating a reference phase relative to the phases of said chrominance signal, the combination of: an electron flow device having an electron flow following a path to a collector, means to introduce modulations representative of said chrominance signal into said electron flow, means to derive demodulating signals having different phases of said chrominance signal from said color synchronizing bursts, means to introduce modulations representative of each of said plurality of demodulating signals at different points into said electron flow between the point at which modulations representative of said chrominance signal are introduced into said electron flow by said modulation introducing means and said output electrode, means coupled to said electron flow device and responsive to electron flow modulations at said output electrode and at other prescribed points in said electron flow different from those points at which modulations representative of said demodulating signals are introduced into said electron flow to develop a plurality of color difference signals corresponding to color information occurring at phases in said chrominance signal different from the phases of said plurality of demodulating signals.

13. In a color television receiver adapted to receive a color television signal including a chrominance signal wherein occur modulations representative of different color difference signals at different phases of said chrominance signal relative to a reference phase, said color television signals also including color synchronizing bursts during each retrace interval, said color synchronizing bursts indicating a reference phase relative to the phases of said chrominance signal, the combination of: an electron flow device having an electron flow following a path to a collector, means to introduce modulations representative of said chrominance signal into said electron flow, means to derive demodulating signals having different phases of said chrominance signal from said color synchronizing bursts, means to introduce modulations representative of each of said plurality of demodulating signals at different points into said electron flow between the point at which modulations representative of said chrominance signal are introduced into said electron flow by said modulation introducing means and said output electrode, means coupled to said electron flow device and responsive to electron flow modulations at said output electrode and at other prescribed points in said electron flow different from those points at which modulations representative of said demodulating signals are introduced into said electron flow to develop a plurality of color difference signals corresponding to color information occurring at selected phases in said chrominance signal.

14. In a color television receiver adapted to receive a color television signal wherein occur modulations representative of different color difference signals at different phases of said chrominance signal relative to a reference phase, said color television signal also including color synchronizing bursts which occur during each retrace interval, said color synchronizing bursts indicating a reference phase relative to the phases of said chrominance signal, the combination of: an electron flow device having an electron flow discharged along a prescribed path toward a collector, means to introduce modulations representative of said chrominance signal into said electron flow at a first point in said path, means to derive from said chrominance signal a plurality of demodulating signals having different phases of said chrominance signal and which are accurately maintained in phase by said color synchronizing bursts, means to introduce modulations representative of a first demodulating signal having a phase corresponding to a first phase of said chrominance signal into said electron flow at a second point which is located between said first point and said collector, electrode and circuit means responsive to said modulations introduced into said electron flow and including an electrode positioned at a third point in said path located between said second point and said collector and operatively connected to produce a color difference signal corresponding to information occurring at said first phase in said chrominance signal, means to introduce modulations representative of a second of said demodulating signals having a second phase of said electron flow at a fourth point in said chrominance signal located between said third point and said collector to develop color difference signal information representative of information occurring at both said first and second phases of said chrominance signal at said collector to form a color difference signal thereon corresponding to a third phase of said chrominance signal.

15. In a color television receiver adapted to receive a color television signal including a chrominance signal wherein occur modulations representative of a plurality of color difference signals occurring at different phases of said chrominance signal relative to a reference phase and having different relative amplitudes, said color television signals also including color synchronizing bursts which occur during each retrace interval, said color synchronizing bursts indicating a reference phase relative to the phases of said chrominance signal, a color balance circuit comprising in combination: an electron flow device having an electron flow which passes along a path to a collector and which is capable of having signals introduced and signals derived from different points along said path of said electron flow, means to introduce modulations representative of said chrominance signal at a first point in the path of said electron flow, means to derive from said color synchronizing bursts demodulating signals each having a phase at which one of said plurality of color difference signals occurs in said chrominance signal, means to introduce modulations representative of the demodulating signals having a first phase corresponding to one of said plurality of color difference signals into said electron stream at a point between said first point and said collector, means to derive color difference signal information corresponding to said first phase of said chrominance signal from a second point in said electron stream located between said first point and said collector thereby altering the signal strength of color difference signal information remaining in said electron flow after said electron flow passes by said second point, means to apply a demodulating signal having a phase corresponding to the phase at which a second of said plurality of color difference signals occurs in said chrominance signal to a third point of said path located between said second point and said collector, means to derive color difference signal information corresponding to said second phase of said chrominance signal from a fourth point in said path located between said third point and said collector whereby color difference signal information remaining in said chrominance signal in said electron flow after said fourth point is altered in accordance with the amplitude level of the color difference signal information derived at said fourth point, circuit means coupled to said collector to produce a chrominance signal wherein the relative amplitudes of color difference signal modulations thereon is altered with reference to the amplitudes of color difference signal modulations on said received chrominance signal.

References Cited in the file of this patent

UNITED STATES PATENTS

| | | |
|---|---|---|
| 2,163,939 | Dillenburger | June 27, 1939 |
| 2,775,691 | Rennick | Dec. 25, 1956 |
| 2,779,818 | Adler | Jan. 29, 1957 |